(12) United States Patent
Bonte et al.

(10) Patent No.: US 12,041,885 B2
(45) Date of Patent: Jul. 23, 2024

(54) AGRICULTURAL BALING MACHINES

(71) Applicant: CNH Industrial America LLC, New Holland, PA (US)

(72) Inventors: Xavier G. J. M. Bonte, PB Zuidzande (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 616 days.

(21) Appl. No.: 17/306,205

(22) Filed: May 3, 2021

(65) Prior Publication Data

US 2021/0251148 A1 Aug. 19, 2021

Related U.S. Application Data

(63) Continuation of application No. PCT/EP2019/079688, filed on Oct. 30, 2019.

(30) Foreign Application Priority Data

Nov. 2, 2018 (EP) .................................... 18204221

(51) Int. Cl.
   *A01F 15/08* (2006.01)
   *A01B 71/06* (2006.01)
   (Continued)

(52) U.S. Cl.
   CPC ........ *A01F 15/0841* (2013.01); *A01F 15/042* (2013.01); *A01F 15/046* (2013.01);
   (Continued)

(58) Field of Classification Search
   CPC .. A01F 15/0841; A01F 15/042; A01F 15/046; A01B 71/06; F16H 37/124
   See application file for complete search history.

(56) References Cited

U.S. PATENT DOCUMENTS

2,890,646 A * 6/1959 Soteropulos ........ A01F 15/0825
                                                       100/909
3,482,456 A    12/1969 May et al.
(Continued)

FOREIGN PATENT DOCUMENTS

EP       0 819 374 A1    1/1998
WO    2014/170318 A1    10/2014

OTHER PUBLICATIONS

Notification of Transmittal of the International Search Report and the Written Opinion of the International Searching Authority, or the Declaration dated Jan. 22, 2020 for International Application No. PCT/EP2019/079688 (13 pages).
(Continued)

*Primary Examiner* — Abigail A Risic
(74) *Attorney, Agent, or Firm* — Peter K. Zacharias; Rebecca L. Henkel; Rickard K. DeMille

(57) ABSTRACT

A mobile baling machine including a rotary input shaft connected by way of a driveline to a rotatable flywheel; and a drive converter that converts rotation of the flywheel to reciprocal rectilinear motion of a plunger, in a bale-forming chamber forming part of the baling machine, in manner forming plant matter in the bale-forming chamber into a compressed form; the driveline including one or more clutches for controlledly transferring rotary drive between the input shaft and the flywheel, wherein the driveline includes a transmission including driveline components defining at least first and second selectable transmission ratios between the input shaft and the flywheel; and wherein the baling machine includes or is operatively connected to one or more controllers that selectively engage a relatively lower, first said transmission ratio or a relatively higher, second said transmission ratio in dependence on conditions prevailing in the baling machine.

27 Claims, 3 Drawing Sheets

(51) Int. Cl.
*A01F 15/04* (2006.01)
*F16H 37/12* (2006.01)

(52) U.S. Cl.
CPC ............ *F16H 37/124* (2013.01); *A01B 71/06* (2013.01); *F16D 2500/10437* (2013.01); *F16D 2500/30406* (2013.01)

(56) References Cited

U.S. PATENT DOCUMENTS

| | | | | | |
|---|---|---|---|---|---|
| 5,123,338 | A | * | 6/1992 | Mathis | ................ A01F 15/0825 56/341 |
| 5,303,789 | A | * | 4/1994 | Adamson | ............... B60K 25/06 280/789 |
| 6,101,932 | A | * | 8/2000 | Wilkens | .............. A01F 15/0825 100/41 |
| 6,257,131 | B1 | * | 7/2001 | Wilkens | .............. A01F 15/0825 100/50 |
| 6,457,405 | B1 | * | 10/2002 | Lippens | .............. A01F 15/0825 100/192 |
| 7,007,599 | B2 | * | 3/2006 | Roth | ..................... A01F 15/101 100/99 |
| 9,119,347 | B2 | * | 9/2015 | Bonte | ................... B30B 9/3007 |
| 10,568,269 | B2 | * | 2/2020 | Verhaeghe | .......... A01F 15/0841 |
| 11,051,455 | B2 | * | 7/2021 | Monbaliu | .......... A01F 15/0825 |
| 11,089,734 | B2 | * | 8/2021 | Verhaeghe | ............ B30B 9/3025 |
| 2013/0152805 | A1 | | 6/2013 | Roth | |
| 2014/0137757 | A1 | * | 5/2014 | Nelson | ................ A01F 15/0841 100/102 |

OTHER PUBLICATIONS

Extended European Search Report dated May 15, 2019 for European Patent Application No. 18204221.8 (6 pages).

* cited by examiner

AGRICULTURAL BALING MACHINES

CROSS REFERENCE TO RELATED APPLICATION

This application is a continuation of International Application No. PCT/EP2019/079738 filed Oct. 30, 2019, which claims priority to European Application No. 18204212.7 filed Nov. 2, 2018, the contents of which are incorporated herein by reference.

FIELD OF THE INVENTION

The invention relates to an agricultural baling machine; a combination of an agricultural baling machine with a towing vehicle; and a method of providing operative power to an agricultural baling machine.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from one parallel to the longitudinal length of the baling machine to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally, a heavy flywheel (that in some baling machine designs weighs 600 kg or more) is secured to a rotatable shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the absence of the flywheel it might be impossible for the rotary power take-off of a tractor to provide sufficient power to move the plunger, and very high forces might be transmitted back towards the tractor via the PTO shaft potentially causing damage to the baling machine or tractor or making the tractor-baling machine combination difficult to control.

The flywheel and the plunger present a system having a high level of inertia and, in some cases, mechanical resistance (especially when the driveline is at rest or is moving slowly). The inertia and mechanical resistance can be increased by factors such as:

- The at-rest plunger position causing an unfavorable con-rod transmission angle with the consequence that plunger movement is difficult to initiate;
- Plant matter in the bale-forming chamber resisting movement of the plunger; and/or
- Larger, less compressible items, such as tree branches, litter and stones, impeding movement of the plunger in the bale-forming chamber.

Often the output power of the tractor that is connected to tow and power the baling machine is poorly matched to the energy requirements of such a system, and in some cases it is not known what the power output of the tractor may be. Such factors lead to numerous practical problems.

If the power output of the tractor is high, and as explained the inertia and/or mechanical resistance of the flywheel/plunger system also is high, the engagement of drive via a PTO shaft connected to the tractor can cause excessive slip in the clutch.

Such slip can occur suddenly, especially when the power output of the tractor is unexpectedly high or is poorly controlled by the tractor driver. The slipping arises instead of movement of the plunger as is desired, because at such a time the driveline components on the flywheel/plunger side of the clutch may effectively appear as a very high or infinite resistance to the motion of the PTO shaft.

Slipping of the clutch can cause a very rapid temperature increase in the parts of the clutch. This gives rise to premature failure of the friction material of the clutch plates, with clutch burn-out sometimes occurring just a few seconds (e.g. 1-5 seconds) after engagement of rotary drive in the PTO shaft.

Clutch burn-out of this kind is highly inconvenient, as a minimum requiring replacement of part or all of the clutch. It may be necessary to wait a lengthy period after burn-out has occurred until the parts of the clutch are cool enough to be handled during replacement. The location of the clutch parts may mean that substantial dismantling of the baling machine is necessary before the clutch can be replaced. The friction plates and parts connected to them may be distorted or welded together in ways making their replacement difficult and time-consuming.

Even if the clutch does not burn out as a result of excessive slip, such a phenomenon shortens the service life of the clutch and presents a significant fire risk (for example in the event of dry plant matter or other combustible material such as hydraulic fluid coming into contact with overheated clutch or other driveline parts). A fire in a baling machine typically presents a serious risk to the safety of personnel nearby and a risk of damage to other machinery such as a towing tractor.

Also, such an event nearly always results in the burning of valuable plant matter lying in a field; and since baling machines frequently operate in locations removed from public roads it can be difficult for fire tenders to provide assistance.

Other problems arise if the power output of the towing tractor is too low.

In such a situation the energy of the PTO shaft may be insufficient to cause either movement of the plunger or slipping of the baling machine driveline clutch, with the result that on engagement of the power take-off the engine of the tractor stalls. This may cause damage to the power take-off components or in some cases the engine of the tractor. Even if these outcomes do not occur, the inevitable interruptions in the baling activity are undesirable because of their adverse effect on bale quality and integrity and the wasting of commercially valuable plant matter.

Some tractor power take-offs include one or more PTO clutches intended to protect the tractor engine by preventing stalling caused as described above. In such systems although engagement of rotary drive via the power take-off would not result in engine damage, a likely outcome is inconsistent baling resulting from the failure to drive the plunger. Moreover in some cases various forms of manual (operator) intervention may be required. This adversely affects the efficiency of baling operations.

A tractor operator who becomes aware that the tractor is under-powered as explained may adjust the settings of the baling machine e.g. during start-up in order to reduce the density of the bales produced by the machine to levels appropriate to the power output of the tractor. Although this may avoid problems such as those explained above, the result may be a low-density bale the commercial value of which is less than a bale of higher density.

WO2014/170318 A1 discloses an agricultural baler comprising a flywheel that is connected via a cardan coupling to a PTO of a tractor, the cardan coupling comprising a torque-limiter adapted for disengaging the flywheel from the PTO when a predetermined torque is exceeded, wherein the cardan coupling further comprises transmission means that are switchable between a start-up state and a running state, in the start-up state the transmission means being configured to only partially transmit rotational movement of the PTO to the flywheel while in the running state the transmission means being configured to fully transmit rotational movement of the PTO to the flywheel.

EP 0819374 A1 discloses a baling machine including a flywheel driveline that includes an intermediate transmission. The intermediate transmission may be configured variously so that either or two transmission ratios may be selected. Selection of the ratios may be effected by different actuator types explained in EP 0819374 A1.

The invention seeks to solve or ameliorate one or more problems of prior art baling machines.

Embodiments of the invention are suitable for inclusion in all baling machine types and machinery combinations disclosed herein. The disclosure of embodiments or parts of embodiments herein includes their disclosure in combination with all baling machine types and machinery combinations herein, even if these are indicated as forming part of the prior art.

The terms "baling machine" and "baler" are used synonymously herein and in the art generally.

The term "power take-off" is synonymous with the acronym "PTO".

The term "tractor" embraces a wide variety of machines potentially capable of towing a baling machine, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

According to embodiments disclosed herein there is provided an agricultural baling machine including a rotary input shaft connected by way of a baler driveline to a rotatable flywheel; and a drive converter that converts rotation of the flywheel to reciprocal rectilinear motion of a plunger, in a bale-forming chamber forming part of the baling machine, in manner compressing plant matter in the bale-forming chamber; the driveline including one or more clutches for controlledly transferring rotary drive between the input shaft and the drive converter, wherein the driveline includes a transmission including driveline components defining at least first and second selectable transmission ratios between the input shaft and the flywheel; wherein the baling machine includes or is operatively connected to one or more controllers that selectively engage driveline components defining the first transmission ratio or driveline components defining the second transmission ratio in dependence on conditions prevailing in the baling machine; and wherein the speed ratio of at least one of the first and second transmission ratios is less than 1.

Preferably the speed ratio of the first transmission ratio is greater than 1 and the speed ratio of the second transmission ratio is less than 1.

In embodiments described herein the transmission ratios are defined by respective sets of meshing rotary gears, but this need not necessarily be the case. Thus in alternative embodiments one or more sub-systems such as but not limited to a continuously variable transmission (CVT), torque converter or similar device may be provided in order to permit the selection of respective ratios as defined. As is well known, CVT's and torque converters may take a variety of forms. The disclosure hereof may be taken as including all such forms as may be included in the aforesaid transmission. Mixtures of transmission sub-system types are possible in one and the same transmission.

Advantageously such a baling machine is able to match the tractor PTO power output to the internal driveline of the baling machine.

Initial selection of the first transmission ratio having a speed ratio greater than 1, i.e. a reduction ratio means that a relatively low power output tractor can initiate movement of the plunger of even a large baling machine, by reason of the mechanical advantage of the first, reduction transmission ratio.

Selection of such a ratio also is of help when the tractor PTO power output is high, or is badly controlled, by the tractor driver; or when the inertia and mechanical resistance of the plunger are high. The reduction transmission ratio reduces the rotational speed of the driveline on the PTO side of the clutch with the result that slipping of the latter is less likely than in the prior art. Put another way, for the same clutch loading the first transmission ratio when selected generates a higher maximum output torque than the second transmission ratio. The latter, having a speed ratio of less than 1, effectively overdrives the flywheel once it has been accelerated to an intermediate speed using the first transmission ratio.

Preferably the driveline components additionally define one or more further selectable transmission ratios. The one or more further selectable transmission ratios may include e.g. third, fourth, etc. ratios that when engaged, i.e. selected, result in rotation of the flywheel in the same direction as results from selection of the first or second transmission ratio. Equally it is possible for one or more of the further transmission ratios to be a reverse ratio the engagement of which causes rotation of the flywheel in an opposition direction. The person of skill in the art may embody such a reverse ratio based on the principles explained herein, and knowledge of transmission design.

When more than two reduction ratios are provided these may be arranged so that sequential selection of the ratios causes progressive adjustment of the ratio of the transmission from an initial reduction ratio via one or more intermediate reduction ratios to a final accelerative ratio that overdrives the flywheel; or that may be e.g. a 1:1 speed ratio.

Also, preferably the baling machine includes one or more sensors for sensing the statuses of one or more parts of the driveline and operatively connected to one or more said controllers that operate in dependence on the outputs of the one or more sensors. As a result, the driveline of embodiments described herein may be regarded as "intelligent", in that the settings commanded by the one or more controllers are determined on the basis of real time (or near-real time) assessments of prevailing conditions.

Typically, the sensor(s) would be of a type that generates an electrical signal output; and the one or more controllers of a type that is capable of receiving and responding to such signals.

In more detail, preferably one or more said sensors measures slip in at least one said clutch and generates an output indicative of the degree of slip. Measuring slip provides for accurate control of the driveline.

Additionally, or alternatively, the baling machine includes a clutch fluid flow circuit for causing flow of clutch fluid to and from at least one said clutch thereby defining upstream and downstream sides of the fluid circuit relative to the at least one said clutch; and one or more said sensors may measure the temperature of the clutch fluid in the flow circuit on the said downstream side. The inventors have found that this also provides an accurate indication of the degree of slip in certain types of clutch that may suitably be used in the agricultural baling machine.

As an alternative to the foregoing it may be possible, in embodiments, to determine clutch slip by measuring the temperature of clutch fluid in a clutch fluid reservoir. By "clutch fluid reservoir" is meant any container of such fluid that acts as a source of fluid used in the operation of a clutch.

However other methods of determining the degree of slip of the clutch are possible, and include using sensors to compare the rotational speed of the driveline on opposite sides of the clutch.

Thus, a rotational speed sensor may determine the rotational speed of a shaft on the PTO side of the clutch and a further sensor may determine the rotational speed of the flywheel or another component on the other side of the clutch. The respective sensors may generate electrical (or other physical) output signals that the one or more controller(s) may compare to give an indication of slip in the clutch.

Preferably the input shaft is connectable via a first said clutch to driveline components including mutually meshed first and second gears defining the first transmission ratio; and via driveline components including mutually meshed third and fourth gears defining the second transmission ratio to a second said clutch, the outputs of the second gear and the second clutch being common and the controller preventing the first and second clutches from being simultaneously closed in a drive-transferring manner.

The first transmission ratio and second transmission ratio may be defined in other ways than through the described combination of meshed gears and clutches. As examples one may consider toothed drive belts driving differently sized belt wheels; chain wheel, sprocket and chain combinations; and mutually engaged rotatable cones. An advantage of the disclosed meshed gear arrangement however is that the driveline is "positive", with minimal risk of inaccuracy caused by component wear, tolerancing effects and backlash. Also the number of components making up the driveline is kept to a minimum, they are easy to replace when worn and are relatively quiet in operation.

Preferably the baling machine includes one or more sensor for measuring slip at the first clutch and one or more sensor for measuring slip at the second clutch and generating outputs indicative of the degree of slip at the first and the second clutch respectively. As explained in more detail hereinbelow, this arrangement provides for accurate control of the driveline. The sensor outputs may be physical (especially electrical) signals of the kinds disclosed herein.

Further preferably the baling machine includes one or more common sensor for measuring slip at the first clutch and at the second clutch, at least one said common sensor detecting the rotational speed of the flywheel and generating an output signal indicative thereof; and one or more said controller comparing the output signal of the common sensor with a signal indicative of the rotational speed of the input shaft.

An advantage of this arrangement relates to the feature that in embodiments described herein the first and second clutches are arranged and/or controlled so that only one of them is closed (i.e. configured in a drive-transferring, i.e. ratio selecting, manner) at a time. It is desirable to measure the speed of the flywheel that is selectively connectable to the output side of each of the first and second clutches, since this ensures accurate comparisons.

The mentioned signal indicative of the rotational speed of the input shaft may be derived in a variety of ways. For example a further sensor may measure the speed of the input shaft; or data may be input to the one or more controllers e.g. from a towing tractor or by way of an input device. In this regard it may be the case that the rotational speed of the input shaft at least notionally is constant, for example being controlled to be 1000 rpm (which is a PTO shaft speed commonly encountered in the tractor art), and this information may be input to the one or more controllers in a variety of ways for example as described below.

In an advantageous, optional aspect the one or more controllers are capable of selectively disengaging rotary drive between the input shaft and the flywheel. As a result in the event of excessive clutch slip being detected the drive through the slipping clutch can be rapidly disengaged, thereby minimising the risk of clutch wear or burn-out, fires and other hazards as described above.

An advantageous control philosophy for the baling machine of embodiments described herein is that the one or more controllers engage the first transmission ratio during transitioning of the flywheel from rest or near-rest to an intermediate movement speed and the second transmission ratio during transitioning of the plunger from the intermediate speed to a higher movement speed.

Such an approach matches the driveline ratio to the load requirements of the driveline and the output of the tractor PTO in a manner ensuring that effective starting up of the flywheel occurs, without risks as described.

Optionally as implied above the mobile baling machine includes one or more input devices for inputting to one or more said controllers an indication of the energy of a power take-off shaft connected or connectable to drive the input shaft.

The input device may take a variety of forms, non-limitingly including e.g. a keypad via which a rated PTO power and/or speed output value of the towing tractor may be entered; a bar code reader that reads a bar code, secured to the PTO of the tractor, including power and/or speed output data; a wired or wireless telemetry link that provides communication from a control device such as a microprocessor in the towing tractor on connection of the baling machine to the PTO; or a wired or wireless telemetry link to a sensor, forming part of the PTO, that generates signals indicative of the rated and/or prevailing PTO power and/or speed output.

In an important aspect preferably the mobile baling machine includes a rigid gearbox housing substantially enclosing the driveline. Also preferably the baling machine includes two or more frame members that are spaced apart from one another each forming part of a machine frame, and the gearbox housing rigidly interconnects two or more said frame members in a manner stiffening the machine frame. In this way the inclusion of the specified driveline components makes possible the construction of an improved baling machine having superior frame stiffness to prior art machines.

Preferably the driveline components defining the first transmission ratio occupy a first vertically extending distance in the gearbox housing and the driveline components defining the second transmission ratio occupy a second vertically extending distance in the gearbox housing, the upper limit of the second vertically extending distance terminating below the upper limit of the first vertically extending distance. The inverse of this arrangement also is possible, such that the components of the first transmission ratio are below or substantially below those of the second transmission ratio.

Such aspects also represent an importantly advantageous feature of embodiments disclosed herein, since they permit benefits in terms of the designs of various parts affecting the geometry, and hence the in-use performance, of the baling machine when it is being towed.

In an embodiment of the baling machine disclosed herein the mass of the flywheel may be approximately 320 kg. This is considerably less than the typical flywheel mass as mentioned above, and is made possible because of the use of a multi-speed driveline transmission to match the prevailing tractor PTO output to the flywheel load requirement. In particular when the plunger is moving at a high speed with the second transmission ratio engaged the relatively low mechanical advantage of this ratio means that a reduced flywheel effect is needed.

The use of a lighter flywheel than is prevalent in the prior art means that initiation of the movement of the plunger is facilitated; it saves on manufacturing material and costs; and it reduces the fuel consumption of a tractor towing a baler in accordance with described embodiments.

Further in respect of the control philosophy adopted, preferably on the slip measured at the first clutch exceeding a threshold value during transitioning of the flywheel from rest or near-rest to an intermediate movement speed one or more said controller disengages the first clutch.

It also is preferable that the mobile baling machine includes one or more moveable walls of the bale-forming chamber and one or more actuators for effecting movement of at least one said moveable wall, wherein on the slip measured at the first clutch exceeding a threshold value during transitioning of the flywheel from rest or near-rest to an intermediate movement speed one or more said controller activates a said actuator to cause enlargement of the bale-forming chamber.

Thus in embodiments the mobile baling machine may respond in a variety of ways to the detection of excessive slip at one or more clutches forming part of the driveline. The responses may be selected as part of an escalating response approach, in which if an initial action (disengaging the clutch) does not, on re-engagement, result in removal of the cause of slipping a further, more aggressive intervention (enlarging the bale-forming chamber to reduce the resistance to motion of the plunger) may be attempted. In many instances this will permit plunger movement without a need for the tractor operator to access the bale-forming chamber to clear a blockage.

In embodiments of the invention at least one controller or includes a programmable device that is arranged and/or programmed to effect a method of operation of the agricultural baling machine in which on initiation of movement of the plunger from rest or near rest the first transmission ratio is selected before being disengaged in favour of engagement of the second transmission ratio depending on one or more variable parameters of the baling machine during engagement of the first transmission ratio achieving a predetermined threshold value. Non-limiting examples of such devices include microprocessors and line controllers. However, other forms of controller also may be provided, in substitution for or enhancement of a programmable device. Such controller forms may include e.g. electronic circuits.

Preferably at least one clutch in the driveline of the mobile baling machine is or includes a spooled wet clutch. Wet clutches are more stable in use then dry clutches. Also it is easier to know the torque that will be transmitted through a wet clutch than a dry clutch. The heat that is produced in the wet clutch can dissipate with flow of clutch oil. This is not the case with a dry clutch. A dry clutch is cooled by the surrounding air or the mass of its components.

In addition to the foregoing, the invention is considered to reside in a combination of a baling machine as defined and a powered vehicle including a rotary power take-off, the powered vehicle towing the baling machine and the combination including a rotatable power take-off shaft connected between the power take-off of the powered vehicle and the rotary input shaft of the baling machine.

In yet a further aspect in embodiments described herein there is provided a method of powering an agricultural baling machine including a rotary input shaft connected by way of a driveline to a rotatable flywheel; and a drive converter that converts rotation of the flywheel to reciprocal rectilinear motion of a plunger, in a bale-forming chamber forming part of the baling machine, in manner forming plant matter in the bale-forming chamber into a compressed form; the driveline including one or more clutches for controlledly transferring rotary drive between the input shaft and the flywheel, wherein the driveline includes a transmission including driveline components defining at least first and second selectable transmission ratios between the input shaft and the flywheel; and the baling machine including or being operatively connected to one or more controllers that selectively engage the first transmission ratio the speed ratio of which is greater than 1 or the second, transmission ratio the speed ratio of which is less than 1 in dependence on conditions prevailing in the baling machine, the method including the steps of:

a. powering the input shaft to rotate, while the flywheel is substantially at rest and while the first transmission ratio is engaged;

b. detecting slip of at least one said clutch and if the slip is less than a threshold amount:

c. disengaging the first transmission ratio when the flywheel attains a predetermined level of kinetic energy and engaging the second transmission; or, if the slip is greater than the threshold amount:

d. disengaging the first transmission ratio without engaging the second transmission ratio.

Such a method advantageously may be practised using apparatus as described herein.

Optionally the method includes the step of, after Step d., e. re-engaging the first transmission ratio and repeating Steps b. and c. or d.

Further optionally the bale-forming chamber may include one or more moveable walls and one or more actuators for effecting movement of at least one said moveable wall, the method including, after Step d., activating one or more said actuator to cause enlargement of the bale-forming chamber.

The method also optionally may include towing the baling machine behind a powered vehicle that includes a rotary power take-off connected by a rotatable power take-off shaft to the rotary input shaft of the baling machine.

Further the method may include operation of a programmable device that is programmed whereby on initiation of movement of the plunger from rest or near rest the first, relatively wide reduction transmission ratio is selected before being disengaged in favour of engagement of the second, relatively close reduction transmission ratio, engagement of the second, relatively close reduction transmission ratio depending on one or more variable parameters of the baling machine during engagement of the first relatively wide reduction transmission ratio achieving a predetermined threshold value.

Optionally the method may include the step of sensing one or more conditions prevailing in the powered vehicle and operating one or more said clutch in dependence on one or more sensed conditions prevailing in the powered vehicle and/or the step of sensing one or more variable parameters of the towing vehicle and causing engagement of the second transmission ratio depending on one or more variable parameters of the towing vehicle during engagement of the first transmission ratio achieving a predetermined threshold value and/or operation of the programmable device that is programmed whereby on initiation of movement of the flywheel from rest or near rest the first transmission ratio is selected before being disengaged in favour of engagement of the second transmission ratio, engagement of the second transmission ratio depending on one or more variable parameters of the towing vehicle during engagement of the first transmission ratio achieving a predetermined threshold value.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE INVENTION

Figure 1:
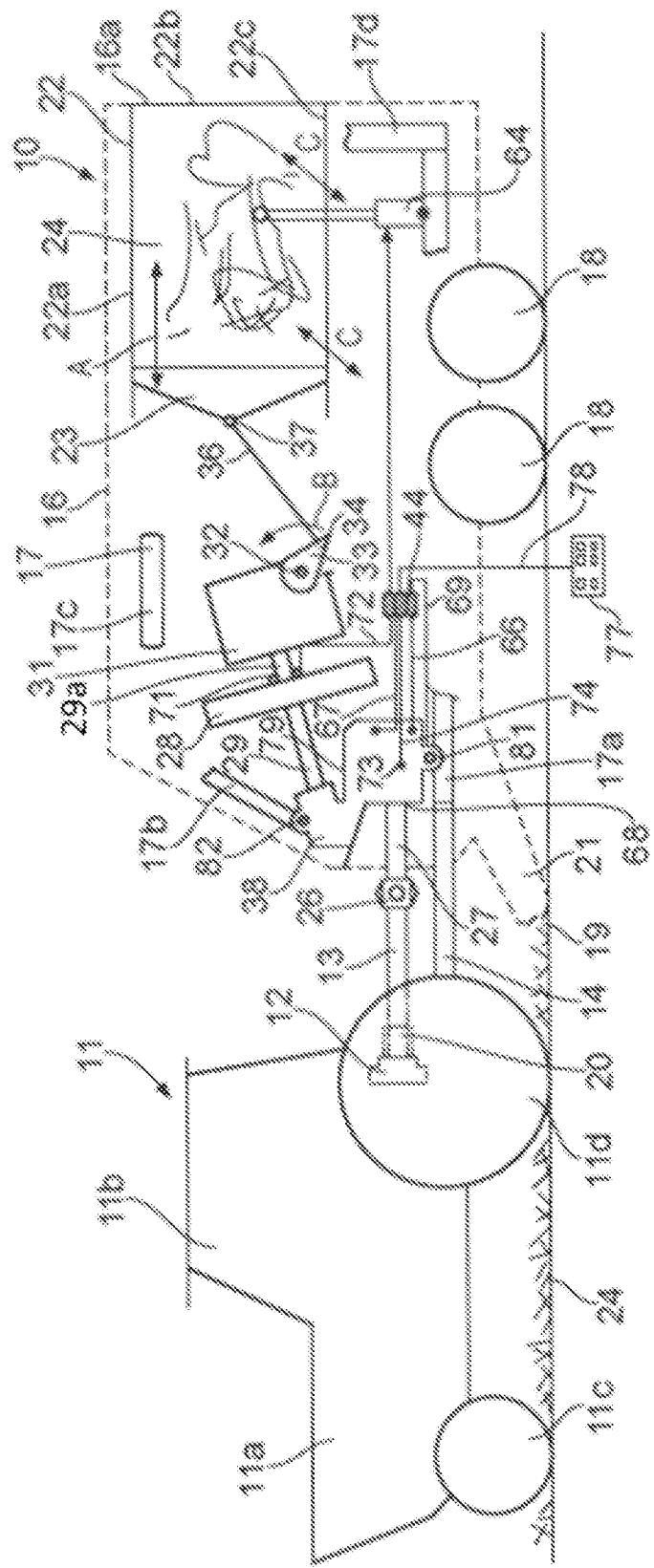
FIG. 1 is a schematic representation of a tractor-baling machine combination in accordance with embodiments described herein.

Referring to the drawings a baling machine 10 is shown being towed behind a towing vehicle that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baling machine 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimizes the distance between the pick-up 19 (described below) of the baling machine 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baling machine 10 is secured to the rear of the tractor 11 by way of a drawbar 14 that typically is of an "A"-shape when viewed in plan and extends forwardly of the baling machine 10 below the PTO shaft 13. The drawbar 14 is pivotably secured to a conventional towing hitch at the rear of the tractor 11.

The baling machine 10 includes a housing or cover 16 that may take a variety of forms. The housing 16 in most baling machine designs includes a section 16a that is open to permit ejection of formed bales at the rear of the baling machine 10.

Panels defining the housing 16 further may be openable or removable in order to permit maintenance of the interior parts of the baling machine 10 replacement of bobbins of twine used for tying completed bales or the clearance of blockages that can arise for a variety of reasons.

The housing 16 of the baling machine 10 is secured to a baling machine frame 17 selected parts 17a, 17b, 17c, 17d of which are illustrated in FIG. 1, with the complete frame 17 being omitted for ease of illustration.

The baling machine 10 is mobile and to this end it includes secured to the frame 17 two or more ground-engaging wheels 18.

In the embodiment illustrated four wheels are provided, being left and right front wheels and left and right rear wheels 18. In FIG. 1 the left-hand side front and rear wheels are visible.

In this regard the front or forward end of the baling machine 10 is the end of it that is closest to the towing tractor 11, and the terms "rear", "left", "right", "upper", "lower" and derivative terms are interpreted accordingly and as though an observer is looking forwardly along the baling machine 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up 19 projects forwardly of the baling machine 10 and is arranged to collect cut plant matter 24 lying in a field in which the baling machine 10 moves as influenced by the motion of the tractor 11. The pick-up 19 passes the plant matter to a conveyor 21. The conveyor 21 conveys the plant matter inside the baling machine 10 where it undergoes baling.

Numerous designs of pick-up 19 and conveyor 21 are known in the baling machine art and fall within the scope of embodiments disclosed herein. The precise designs of the pick-up 19 and conveyor 21 are essentially immaterial to the nature and operation of the invention, and therefore are not described in detail.

As mentioned, the baling machine 10 includes an internal bale-forming chamber 22. This is an elongate, cuboidal volume defined by chamber walls of which top and bottom walls 22a and 22c are visible in FIG. 1. The bale-forming chamber 22 in a typical baling machine design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baling machine 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baling machine 10. The universal joint 26 in a well-known manner accommodates changes in the relative orientation of the tractor 11 and baling machine 10 that result from towing of the baling machine from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

Flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the invention to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baling machine 10. This drive converter 31 may be referred to as a main transmission in some examples.

The nature of the drive converter 31 thus is such that the longitudinally extending (with reference to the elongate length of the baling machine 10 as illustrated) axis of rotation of the flywheel shaft 29 becomes rotation about a transversely extending axis of a crankshaft 32.

Crankshaft 32 is connected as shown to a crank member 33 that protrudes from the drive converter 31 in a manner presenting a free end 34. The free end 34 is pivotably connected to one end of a conrod 36 the other end of which is pivotably connected, as indicated by numeral 37, to the forward side of the plunger 23.

As is apparent from FIG. 1 therefore, rotation of crankshaft 32 causes rotation of crank 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and therefore are not provided in detail herein.

Charges of plant matter 24 conveyed inside the baling machine 10 from the conveyor 21 repeatedly are at intervals fed by internal components of the baling machine 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
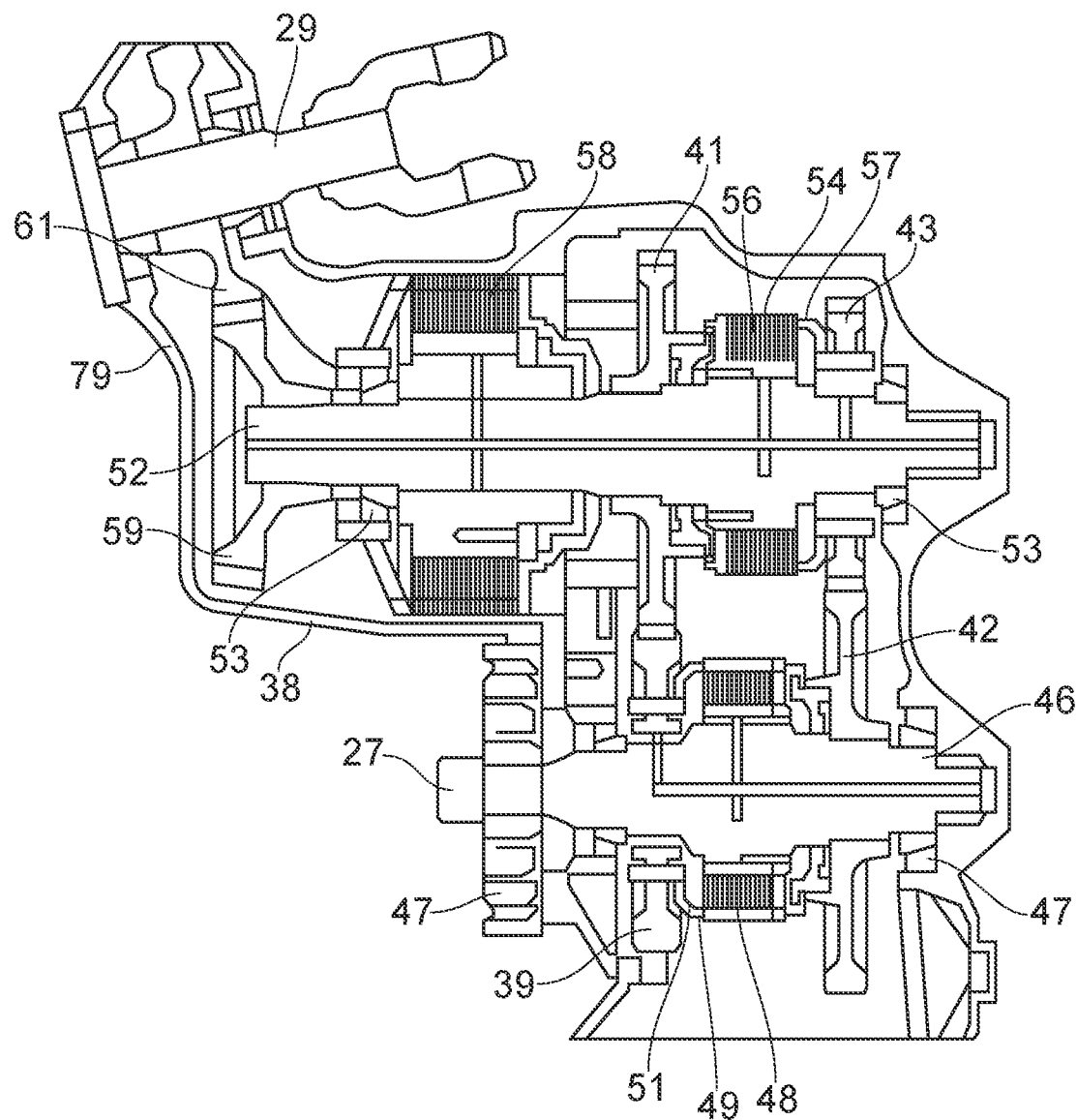
FIG. 2 is a cross-sectional view of a transmission, forming part of the baling machine visible in FIG. 1, according to embodiments described herein.
Figure 3:
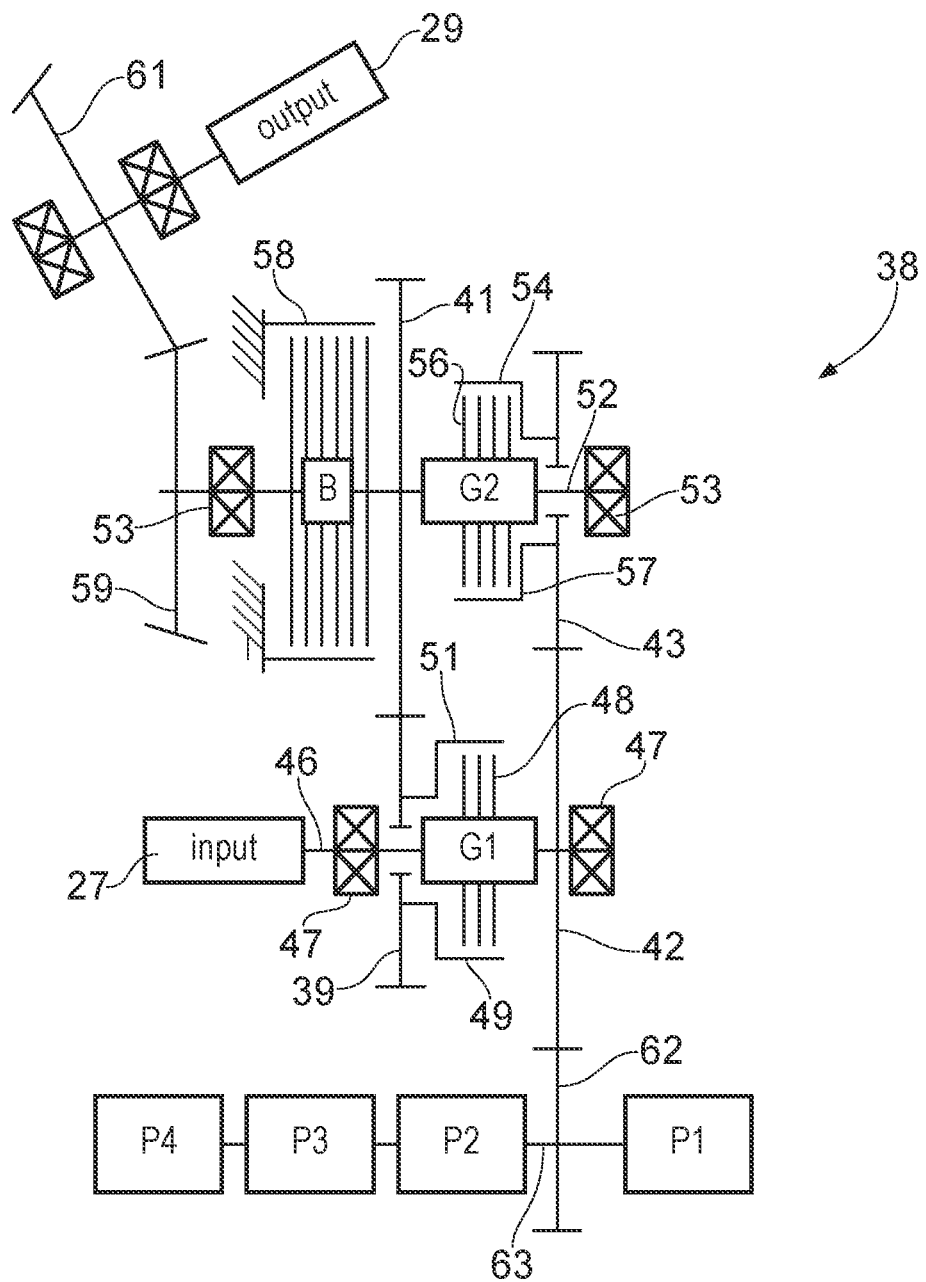
FIG. 3 is a schematic representation of the driveline components of the transmission of FIG. 2.

In FIGS. 2 and 3 the rotary input shaft 27 connects to respective first and second selectable transmission ratios 39, 41; 42, 43 forming part of a driveline defined by driveline components within the transmission 38 and therefore existing between the input shaft 27 and the drive converter 31.

The first transmission ratio is defined by mutually meshing, rotary, toothed gears 39, 41 that each are supported for rotation within the transmission 38. The first transmission ratio 39, 41 is a relatively great reduction ratio transmission providing a high degree of mechanical advantage.

The second transmission ratio is defined by mutually meshing, rotary, toothed gears 42, 43 that each are supported for rotation within the transmission 38 adjacent the gears 39, 41 in a manner defining a parallel driveline to that represented by first ratio 39, 41. The second transmission ratio 42, 43 is a relatively close reduction ratio transmission providing a higher speed of output shaft rotation than the first transmission ratio.

The baling machine 10 includes a controller non-limitingly illustrated schematically in FIG. 1 in the form of a programmable microprocessor 44. The baling machine 10 includes a source of electrical power, for the microprocessor 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated the controller may take a variety of forms and need not be a microprocessor as illustrated, or a single component.

The microprocessor 44 is capable (typically but not necessarily as a result of software and/or firmware programming) of selectively engaging the first 39, 41 or the second 42, 43 transmission ratio. The arrangement of the components and/or the programming of the microprocessor 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. Input gear shaft 46 is locked to gear 42 such that gear 42 always rotates with input gear shaft 46.

Input gear shaft 46 is also locked to an input side 48 of first transmission clutch 49 forming part of the driveline. As a result the input side 48 of first transmission clutch 49 also rotates with the first gear shaft.

First transmission clutch 49 is e.g. electrically or electro-hydraulically activated in the described embodiment, and is selectively engageable under command from the microprocessor 44. When engaged the output side 51 of the first transmission clutch 49 is locked to the input side 48 and rotates therewith.

The output side 51 of first transmission clutch 49 is locked to gear 39 of first transmission ratio 39, 41 such that gear 39 rotates with the output side 51.

In the illustrated embodiment the first transmission clutch 49 lies on first gear shaft 46 intermediate gears 39 and 42, but as will occur to the person of skill in the art this need not be the case, and other clutch and gear position combinations are possible.

As explained gears 42 and 43 are mutually meshed, with gear 43 supported on rotational intermediate gear shaft 52. Intermediate gear shaft 52 is supported (in the non-limiting example shown by way of journal bearings 53 at either end) for rotation relative to the remainder of transmission 38.

By reason of locking of input gear shaft 46 to gear 42, gear 43 rotates whenever input gear shaft 46 rotates, at a speed, relative to the speed of input gear shaft 46, determined by the gear tooth ratio between gears 42 and 43. However, gear 43 merely idles unless a second transmission clutch 54, which may be of a similar design to first transmission clutch 49 and hence operable under command of the microprocessor 44, is engaged.

In this respect intermediate gear shaft 52 is locked to an input side 56 of second transmission clutch 54; and an output side 57 is locked to gear 43. As a result, when the clutch is engaged rotation of gear 43 is transmitted via intermediate gear shaft 52.

Gear 39 is meshed with gear 41 as explained. Gear 41 is locked to intermediate gear shaft 52. Clearly therefore to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via meshed gears 39 and 41 to drive intermediate gear shaft 52 in accordance with the first, reduction transmission ratio "G1" determined by the numbers of teeth of gears 39 and 41. At this time gears 42 and 43 rotate in an idling manner.

When first transmission clutch 49 is disengaged and second transmission clutch 54 is engaged the drive of the input shaft 27 is transmitted via gears 42 and 43 to drive intermediate gear shaft 52 in accordance with the relatively second transmission ratio "G2" determined by the numbers of teeth of gears 42 and 43.

As explained herein, the first transmission ratio G1 is a reduction ratio in which the speed ratio exceeds 1. This provides a beneficial mechanical advantage when moving the flywheel 28 from rest. The second transmission ratio G2 is an accelerative ratio the speed ratio of which is a value less than 1. This causes rotation of the flywheel shaft 29 to be at a higher speed than that of the PTO shaft 13.

It is possible for both the clutches 49, 52 to be disengaged simultaneously. In that case gears 42 and 43 would rotate, but no drive would be transmitted to intermediate gear shaft 52.

Intermediate gear shaft 52 includes mounted thereon an optional brake 58 that may be employed when both the transmission clutches 49, 52 are disengaged to slow the flywheel shaft 29. The latter receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

Gear 42 as illustrated in FIG. 3 may optionally additionally mesh with an auxiliary drive gear 62 that also may be supported in the transmission 38 to co-rotate with input gear shaft 46 in accordance with a transmission ratio determined by the relative numbers of teeth of gears 42 and 62.

Gear 62 is locked to an auxiliary drive shaft 63 that is supported e.g. in journal bearings for rotation with gear 62. Auxiliary drive shaft can be connected to drive one or more hydraulic pumps P1, P2, P3, P4 that may be used to energize one or more hydraulic circuits that are not shown in the drawings hereof. Such circuits may control the operation of a range of actuators that perform auxiliary functions in the baling machine 10. An example of such an actuator is hydraulic actuator 64 described below.

The transmission clutches 49 and 54 may be for example electrically (e.g. solenoid) operated, electro-mechanically operated or electro-hydraulically operated, under the control of the microprocessor 44. Preferably but not essentially the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

FIG. 3 shows that the clutches 49, 54 each have the same number of plates in the illustrated embodiment, but this need not be the case. Unequal numbers of clutch plates therefore are possible.

One form of control of the transmission clutches 49, 54 is illustrated schematically by electrical control signal line 66 that transmits commands from the microprocessor 44 to first transmission clutch 49; and control line 67 that transmits commands from the microprocessor 44 to second transmission clutch 54.

Two-way communication between the transmission clutches 49, 54 and the microprocessor 44 optionally is possible, either using the signal lines 66, 67 or by another means. Using two-way control of the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The microprocessor 44 can generate commands and/or warning signals in dependence on the signals received from the transmission clutches 49, 54.

The microprocessor 44 determines the transmission ratio to be selected in dependence on conditions prevailing in the baling machine, as described in more detail below. To this end the baling machine 10 includes a number of sensors, as described in the following, for sensing the conditions of one or more parts of the driveline and operatively connected to the microprocessor 44. The microprocessor 44 operates in dependence on the outputs of the one or more sensors.

As explained, it is strongly desirable to reduce or preferably eliminate slip of any clutches, such as clutches 49, 54, forming part of the driveline between the input shaft 27 and the flywheel shaft 29. Sensing of slip in the clutches and transmitting output signals, indicating the degree of slip, to the microprocessor 44, are therefore provided for in the baling machine 10.

One way of sensing slip is to sense the rotational speeds of the input shaft 27 and flywheel shaft 29, and compare the sensed speeds (adjusting for the effective prevailing transmission ratio engaged by way of the transmission 38). To this end a first rotational speed sensor 68 senses the speed of input shaft 27 and generates a signal proportional thereto. This signal preferably is transmitted via electrical signal line 69 to the microprocessor 44, although other means of signal generation and transmission (including wireless methods) are possible.

A second rotational speed sensor 71 senses the speed of flywheel shaft section 29a and generates a signal proportional thereto. This signal is transmitted via electrical signal line 72 to the microprocessor 44. As in the case of the first sensor 68, other signal generation and transmission options are possible. Calibration and subtraction of the speed signals from one another gives rise to a slip signal that is proportional to the degree of slip in the clutch 49 or 52 that is engaged at the time of sensing.

When one or more transmission clutches forming part of the driveline of the baling machine 10 is a wet clutch as is preferred, a clutch fluid flow circuit is provided. This conveys clutch fluid via the clutches, thereby giving rise to fluid "upstream" and "downstream" sides of the clutches in the fluid flow circuit. It is possible to sense the temperature of oil in the flow circuit and use this as an indication of clutch slip. For the most accurate fluid temperature-based indication of clutch slip the temperature is sensed immediately downstream of the clutches.

To this end the baling machine 10 optionally includes one or more temperature sensors for one or more of the clutches as schematically represented by numeral 73 and connected to the microprocessor 44 via electrical signal line 74 (or by another signal transmission means, including but not limited to wireless connection). The temperature sensor 73 is arranged as stated to measure the temperature of a fluid, such as the oil of a wet clutch, in a flow circuit forming part of the transmission 38. The sensor 73 generates signals indicative of the sensed temperature and these when received by the microprocessor 44 can be used to indicate whether slip is occurring in the clutch in question.

A temperature-based slip indication signal can be used in its own right to indicate slip, or it may be used to augment another slip indication such as a shaft speed comparison as described above. A temperature signal also can be used for example to help determine a recovery delay following overloading of the transmission 38.

Thus, if for example slip of a clutch in the transmission 38 causes the temperature of clutch oil to rise this will be sensed by the temperature sensor 73 and a clutch rapid disengagement routine called. The microprocessor 44 then can call a routine that delays re-engagement of the clutch in question for a calculated or predetermined recovery period. Alternatively, the microprocessor 44 can command repeated sampling of the oil temperature using the sensor 73 until the temperature is below a threshold value, with re-engagement of the clutch being inhibited until such a temperature is attained.

Although a single temperature sensor 73 is illustrated, this is purely to exemplify the described embodiment. Plural numbers of temperature sensors are possible and indeed likely bearing in mind the plural number of clutches provided.

As is apparent from the foregoing description, the transmission 38 includes two drive transfer paths (respectively via the first transmission ratio 39, 41 (G1) and the second, transmission ratio 42, 43 (G2)) having a common output in the form of the output gears 59, 61 and the flywheel shaft 29, and of which only one drive transfer path at a time is connected in the transmission. Also as is apparent there is provided a respective clutch 49, 54 controlling whether each drive transfer path is engaged.

The sensor arrangement 68, 71 for sensing slip is capable of sensing slip in either of the drive transfer paths and hence in either of the clutches 49, 54, depending on which of them is engaged. This is so notwithstanding that sensors 68, 71, measuring the rotational speed of the input shaft 27 and the flywheel shaft 29, indicate slip in the two drive transfer paths in common.

As also is apparent from the foregoing, the microprocessor 44 is capable of selectively disengaging rotary drive between the input shaft 27 and the shaft 29 supporting the flywheel 28. This possibility is explained further below in connection with operational sequences made possible by the apparatus of the invention.

In this regard a preferred operational method of the baling machine 10 is for the microprocessor 44 initially to command engagement of the first, transmission ratio 39, 41 during starting up of the baling machine 10, when the flywheel 28 is normally at rest. At such a time a maximal force is required to initiate movement of the plunger 23, especially if the plunger 23 starts from a position in the bale-forming chamber 22 giving rise to an adverse transmission angle of the conrod 36 relative to the crank 33. Resistance of the plunger 23 to movement also may for various reasons vary from place to place along the bale-forming chamber with the result that certain plunger positions may give rise to a very high overall resistance to motion.

Engagement of the first, transmission ratio 39, 41 (G1) ameliorates the high resistance problem, by providing a drive transfer path associated with a large mechanical advantage. As a result, it is expected that matching of the output of the tractor PTO 12 to the load requirement represented by the flywheel and plunger combination 28, 23 will be improved compared with the prior art. It further is expected therefore that initiation of movement of the plunger 23 will reliably be achieved in normal circumstances, essentially regardless of the maximum output of the tractor PTO 12.

Driving of the flywheel 28 by way of the first transmission ratio permits the speed at which the plunger 23 reciprocates to increase from rest to an intermediate speed that is less than the normal operational speed. Once the intermediate speed is reached the microprocessor 44 then commands disengagement of first transmission clutch 49, thereby disengaging first transmission ratio 39, 41; and engagement of second transmission clutch 54. The latter step causes engagement of the second, close reduction transmission ratio 42, 43 (G2). This permits further acceleration of the flywheel 28 to its operational speed.

The intermediate speed may be programmed into the microprocessor 44. In the event of the controller being non-programmable a permanent logic regime (as may be provided by e.g. Op Amps or hydraulic logic circuits) may be employed, instead of a programmable logic, to effect the indicated transmission shift from the first to the second transmission ratio.

Once the flywheel 28 has been accelerated to its operational speed the energy required under normal circumstances to maintain the operational speed peaks at a considerably lower level than is required during acceleration of the flywheel 28.

The foregoing means that the baling machine 10 of the invention is capable of successful operation even if the power or torque output of the tractor PTO 12 is less than would otherwise be required in a prior art baling machine to move the flywheel 28 from rest and accelerate it to its operational speed. This is chiefly because in an early phase of acceleration of the flywheel 28 the first ratio 39, 41 is engaged and the mechanical advantage this provides means even a low power or torque output PTO acceptably is matched to the flywheel energy requirement.

Furthermore, the two-stage acceleration regime made possible by the baling machine 10 described herein means that the flywheel 28 can be made lighter than in some prior art baling machines, since its role in smoothing the application of power to the plunger 23 during acceleration of the latter from rest is reduced compared with the prior art. As a consequence, in one embodiment, the mass of the flywheel can be reduced from approximately 600 kg to approximately 320 kg.

This has an obvious benefit in terms of fuel consumption of the tractor required to tow and power the baling machine 10. Further benefits arise in terms of the cost, energy and material requirements during manufacturing of the baling machine 10.

Should slip of the first transmission clutch 49 occur during acceleration of the plunger 23 form rest this would be detected by the sensors described above. In the event of the degree of slip exceeding a threshold (that in like manner to the intermediate speed may be programmed or may be permanently set, depending on the nature of the controller) the microprocessor 44 can take a series of remedial steps aimed at achieving successful baling machine start-up notwithstanding that a clutch is slipping.

As a primary remedial action, the microprocessor 44 can command disengagement of the first transmission clutch 49, thereby disengaging drive via the first transmission ratio 39, 41. When the first transmission clutch 49 is a solenoid-driven spooled wet clutch as is preferred such disengagement may be effected very rapidly, before the slipping causes serious damage to the clutch 49. Moreover, a wet clutch is less likely than a dry clutch to suffer slip-derived damage, since the clutch oil is capable of conveying heat away from the clutch plates in a manner minimizing the chance of overheating occurring.

Following such disengagement, the microprocessor 44 can seek to achieve re-engagement of the first transmission clutch 49. This can be after a delay to allow cooling of the clutch 49. The delay can be based on the elapsing of a period of time after the detection of slip or, if a temperature sensor such as sensor 73 is provided, once the temperature of the clutch oil reduces acceptably (as explained above).

If re-engagement of the first transmission clutch 49 after the delay results in no slip occurring the above-described plunger start-up routine may be continued until the plunger is reciprocating at its operational speed.

If on the other hand re-engagement of the first transmission clutch 49 continues to result in slip this may be because of excessive resistance to motion of the plunger 23, wear of clutch 49 or similar adverse conditions.

High resistance may be caused e.g. by the presence of residual plant matter in the bale-forming chamber 22 that is left over from a previous baling operation.

Such a problem may be alleviated by enlarging the bale-forming chamber 22, and to this end optionally at least one wall of the bale-forming chamber 22 is moveable outwardly as signified by arrows C in FIG. 1. To this end a preferably solenoid-actuated, hydraulic piston 64 interconnects the moveable wall 22c and the frame 17 of the baling machine 10, or another rigid part of the machine 10.

Piston 64 is schematically shown in a position for connection at one end to a side wall of the bale-forming chamber and at the other end to an appropriate part of the machine frame.

The piston 64 may be a double-acting piston that may be controlledly extended, after successful enlargement of the bale-forming chamber 22 has been undertaken, in order to restore the chamber to its normal size.

Piston 64 operates under the command of the microprocessor 44 as signified by exemplary, non-limiting electrical signal line 76. The microprocessor 44 is capable, e.g. as a result of programming, of commanding the piston 64 to retract to enlarge the bale-forming chamber when slipping of the first transmission clutch 49 occurs on re-engagement as described. This reduces the resistance to movement of the plunger caused by plant matter inside the bale-forming chamber 22. Subsequent re-engagement of the first transmission clutch 49 is likely then to result in movement of the plunger 23, without slipping of the first transmission clutch 49 occurring.

Enlargement of the bale-forming chamber 22 in the above-described manner also is of help in the event of the output power of the tractor PTO 12 being high, either because too large a tractor is hitched to the baling machine 10 or because of poor power control on the part of the tractor driver. In such a situation resistance to movement of the plunger 23 is likely to cause slipping of the first transmission clutch 49, but the ability to reduce the resistance by enlarging the bale-forming chamber ameliorates or solves this problem.

Once movement of the plunger 23 has been effected following enlargement of the bale-forming chamber 22 the piston 64 may be commanded by the microprocessor to extend to return the bale-forming chamber to the correct dimensions or working pressure for bale forming. A programmed or otherwise established threshold speed of reciprocation of plunger 23 may be used by the microprocessor 44 to determine when it is safe to reduce the volume of the bale-forming chamber.

Should slipping of the first transmission clutch 49 continue to occur after the bale-forming chamber 22 has been enlarged this also can be detected through operation of the sensors 69/71 and/or 73. A likely cause of such continued slipping is the presence of a large blockage (such as a tree branch, or certain kinds of litter that can be left in a field) in the bale-forming chamber 22. A blockage of this kind probably cannot be cleared through movement of the plunger 23 and instead requires manual clearing from the baling machine 10. The microprocessor 44 can be programmed on detection of further slipping as described to disengage the first transmission clutch 49, operate the brake 58 if this is present and send a warning alert command to e.g. an information display in the cab of the tractor 11.

The baling machine 10 optionally may include one or more input devices 77, represented schematically and non-limitingly in FIG. 1, by means of which information on the energy transmitted via the power take-off shaft 13 may be input to the microprocessor 44.

In FIG. 1 an input device 77 is shown in the form of a keypad connected to the microprocessor 44 via an electrical cable 78, and using which e.g. the rated power output of the tractor 11 can be input to the baling machine 10. The microprocessor can select a set of decision parameters (such as the preferred speed of plunger 23 at which to transition from the first transmission ratio 39, 41 to the second transmission ratio 42, 43) that are optimized for the input power level.

The input device 77 may take a variety of other forms. These include but are not limited to a code reader that can read a code printed or affixed on part of the tractor 11, e.g. adjacent the PTO; a near-field communications (NFC) device that establishes a communications link with a microprocessor forming part of the tractor 11 in order to download power output information; or a cable connection between the microprocessor 44 and a counterpart controller forming part of the tractor 11.

The transmission 38 in preferred embodiments includes a rigid housing 79 that may be formed e.g. by casting from a metal alloy, especially a high stiffness, lightweight alloy.

As explained the baling machine 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baling machine 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the driveline components 39, 41 defining the first transmission ratio occupy a first vertically extending distance in the housing 79; and the driveline components 42, 43 defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baling machine 10, and also that the output of the transmission 38 is connected to the flywheel shaft 29 at a relatively high point in the baling machine 10. This provides several advantages in terms of transferring drive input via the input shaft 27 to the location of the plunger 23, which as mentioned is located relatively high inside the baling machine 10.

Although herein the gear combination G1 is described as the first transmission and gear combination G2 the second transmission ratio, it need not be the case that the lower, in the vertical dimension of the transmission 38, gear combination is the first to be engaged. On the contrary, through appropriate choosing of the sizes, etc., of the various gears the gear combination G2 could be created as a first transmission ratio that is engaged during a start-up routine and G1 as a subsequently engaged transmission ratio.

As explained, more than the two gear combinations G1, G2 may be provided, giving rise in some embodiments to a two-, or three- or more-stage sequence of transmission shifts during plunger start-up rather than the single shift described. Such arrangements may include more than one intermediate shaft such as shaft 52, and/or a reverse gear as explained.

Overall the baling machine 10 described herein provides considerable benefits, as explained, over prior art baling machines.

In addition to the foregoing the invention is considered non-limitingly to reside in methods as described herein and also in a combination of a tractor 11 and baling machine 10 as described, and especially in such a combination in which the tractor 11 tows the baling machine 10 with a rotatable power take-off shaft 13 connected between the power take-off 12 of the tractor 11 and the rotary input shaft 27 of the baling machine 10.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

What is claimed is:

1. An agricultural baling machine, comprising:
    a rotary input shaft connected by way of a baler driveline to a rotatable flywheel; and
    a drive converter that converts rotation of the flywheel to reciprocal rectilinear motion of a plunger in a bale-forming chamber forming part of the baling machine in a manner compressing plant matter in the bale-forming chamber, the driveline including one or more clutches for controlledly transferring rotary drive between the input shaft and the drive converter, the driveline further including a transmission having driveline components defining at least first and second selectable transmission ratios between the input shaft and the flywheel,
    wherein the baling machine includes or is operatively connected to one or more controllers that selectively engage driveline components defining the first transmission ratio or driveline components defining the second transmission ratio in dependence on conditions prevailing in the baling machine, and wherein the speed ratio of at least one of the first and second transmission ratios is less than 1,
    wherein the speed ratio of the first transmission ratio is greater than 1 and the speed ratio of the second transmission ratio is less than 1, and
    wherein the one or more controllers engage the first transmission ratio during transitioning of the flywheel from rest or near-rest to an intermediate movement speed and the second transmission ratio during transitioning of the flywheel from the intermediate movement speed to a higher movement speed.

2. The agricultural baling machine of claim 1, wherein the driveline components additionally define one or more further selectable transmission ratios.

3. The agricultural baling machine of claim 2, wherein there is at least one further selectable transmission ratio that is a reverse gear or defines the reverse gear.

4. The agricultural baling machine of claim 1, further comprising one or more sensors for sensing the conditions of one or more parts of the driveline, the sensors being operatively connected to the one or more controllers that operate in dependence on outputs of the one or more sensors.

5. The agricultural baling machine of claim 4, wherein one or more the sensors measure slip in the at least one clutch and generates an output indicative of the degree of slip.

6. The agricultural baling machine of claim 4, further comprising a clutch fluid flow circuit for causing a flow of clutch fluid to and from the at least one clutch thereby defining upstream and downstream sides of the fluid flow circuit relative to the at least one clutch, and wherein one or more of the sensors measure a temperature of the clutch fluid in the fluid flow circuit on the downstream side of the fluid flow circuit.

7. The agricultural baling machine of claim 5, wherein the one or more clutches includes a first clutch and a second clutch, the input shaft is connectable by way of the first clutch to driveline components including mutually meshed first and second gears defining the first transmission ratio, and by way of driveline components including mutually meshed third and fourth gears defining the second transmission ratio to the second clutch, the outputs of the second gear and the second clutch being common and the controller preventing the first and second clutches from being simultaneously closed in a drive-transferring manner.

8. The agricultural baling machine of claim 7, wherein one or more of the sensors measure slip at the first clutch and one or more of the sensors measure slip at the second clutch and generating outputs indicative of the degree of slip at the first and the second clutch respectively.

9. The agricultural baling machine of claim 8, further comprising one or more common sensor for measuring slip at the first clutch and at the second clutch, the common sensor detecting a rotational speed of the flywheel and generating an output signal indicative thereof; and the one or more controller comparing the output signal of the common sensor with a signal indicative of the rotational speed of the input shaft.

10. The agricultural baling machine of claim 1, wherein the one or more controllers are capable of selectively disengaging rotary drive between the input shaft and the flywheel.

11. The agricultural baling machine of claim 1, further comprising one or more input devices for inputting to the one or more controllers an indication of energy of a power take-off shaft connected or connectable to drive the input shaft.

12. The agricultural baling machine of claim 1, further comprising a rigid gearbox housing substantially enclosing the transmission.

13. The agricultural baling machine of claim 12, further comprising two or more frame members that are spaced apart from one another each forming part of a machine frame, and wherein the gearbox housing rigidly interconnects two or more of the frame members in a manner stiffening the machine frame.

14. The agricultural baling machine of claim 13, wherein the driveline components defining the first transmission ratio occupy a first vertically extending distance in the gearbox housing and the driveline components defining the second, transmission ratio occupy a second vertically extending distance in the gearbox housing, the upper limit of the second vertically extending distance terminating below the upper limit of the first vertically extending distance.

15. The agricultural baling machine of claim 8, wherein the slip measured at the first clutch exceeding a threshold value during transitioning of the flywheel from rest or near-rest to an intermediate movement speed the one or more controller disengages the first clutch.

16. The agricultural baling machine of claim 14, further comprising one or more moveable walls of the bale-forming chamber and one or more actuators for effecting movement of the at least one moveable wall, wherein on the slip measured at the first clutch exceeding a threshold value during transitioning of the flywheel from rest or near-rest to an intermediate movement speed the one or more controller activates the actuator to cause enlargement of the bale-forming chamber.

17. An agricultural baling machine, comprising:
    a rotary input shaft connected by way of a baler driveline to a rotatable flywheel; and
    a drive converter that converts rotation of the flywheel to reciprocal rectilinear motion of a plunger in a bale-forming chamber forming part of the baling machine in a manner compressing plant matter in the bale-forming chamber, the driveline including one or more clutches for controlledly transferring rotary drive between the input shaft and the drive converter, the driveline further including a transmission having driveline components defining at least first and second selectable transmission ratios between the input shaft and the flywheel,
    wherein the baling machine includes or is operatively connected to one or more controllers that selectively engage driveline components defining the first transmission ratio or driveline components defining the second transmission ratio in dependence on conditions prevailing in the baling machine, and wherein the speed ratio of at least one of the first and second transmission ratios is less than 1, wherein the at least one controller of which is or includes a programmable device that is arranged and/or programmed to effect a method of operation of the agricultural baling machine in which on initiation of movement of the flywheel from rest or near rest the first transmission ratio is selected before being disengaged in favour of engagement of the second transmission ratio, engagement of the second transmission ratio depending on one or more variable parameters of the baling machine during engagement of the first transmission ratio achieving a predetermined threshold value.

18. The agricultural baling machine of claim 1, wherein the at least one clutch is or includes a spooled wet clutch.

19. A combination of an agricultural baling machine of claim 1 and a powered vehicle having a rotary power take-off, the powered vehicle towing the baling machine and the combination including a rotatable power take-off shaft connected between the power take-off of the powered vehicle and the rotary input shaft of the baling machine.

20. A method of powering an agricultural baling machine, the agricultural baling machine having a rotary input shaft connected by way of a driveline to a rotatable flywheel, and a drive converter that converts rotation of the flywheel to reciprocal rectilinear motion of a plunger in a bale-forming chamber forming part of the baling machine in a manner of compressing plant matter in the bale-forming chamber, the driveline including one or more clutches for controlledly transferring rotary drive between the input shaft and the flywheel, wherein the driveline includes a transmission including driveline components defining at least first and second selectable transmission ratios between the input shaft and the flywheel, the baling machine including or being operatively connected to one or more controllers that selectively engage a first reduction transmission ratio the speed ratio of which is greater than 1 or a second transmission ratio the speed ratio of which is less than 1 in dependence on conditions prevailing in the baling machine, the method including the steps of:
  a. powering the input shaft to rotate, while the flywheel is substantially at rest and while the first transmission ratio is engaged;
  b. detecting slip of at least one said clutch and if the slip is less than a threshold amount;
  c. disengaging the first transmission ratio when the flywheel attains a predetermined level of kinetic energy and engaging the second transmission ratio or when the slip is greater than the threshold amount; and
  d. disengaging the first transmission ratio without engaging the second transmission ratio.

21. The method of claim 20, further comprising a step e. of re-engaging the first transmission ratio and repeating steps b. and c. or d.

22. The method of claim 20, wherein the bale-forming chamber includes one or more moveable walls and one or more actuators for effecting movement of the at least one moveable wall, the method further including, after Step d., activating the one or more actuator to cause enlargement of the bale-forming chamber.

23. The method of claim 20, wherein the baling machine includes operation of a programmable device that is programmed whereby on initiation of movement of the flywheel from rest or near rest the first transmission ratio is selected before being disengaged in favour of engagement of the second transmission ratio, engagement of the second transmission ratio depending on one or more variable parameters of the baling machine during engagement of the first transmission ratio achieving a predetermined threshold value.

24. The method of claim 23, further including towing the baling machine behind a powered vehicle that includes a rotary power take-off connected by a rotatable power take-off shaft to the rotary input shaft of the baling machine.

25. The method of claim 24, including the step of sensing one or more conditions prevailing in the powered vehicle and operating the one or more clutch in dependence on one or more sensed conditions prevailing in the powered vehicle.

26. The method of claim 24, wherein the baling machine is towed behind the powered vehicle, the method including the step of sensing one or more variable parameters of the powered towing vehicle and causing engagement of the second transmission ratio depending on one or more variable parameters of the powered towing vehicle during engagement of the first transmission ratio achieving a predetermined threshold value.

27. The method of claim 25, further including operation of the programmable device that is programmed whereby on initiation of movement of the flywheel from rest or near rest the first transmission ratio is selected before being disengaged in favor of engagement of the second transmission ratio, engagement of the second transmission ratio depending on one or more variable parameters of the powered towing vehicle during engagement of the first transmission ratio achieving a predetermined threshold value.

\* \* \* \* \*